(12) United States Patent
Sheth et al.

(10) Patent No.: US 9,800,822 B2
(45) Date of Patent: Oct. 24, 2017

(54) METHOD AND APPARATUS FOR RESOURCE UTILIZATION IN A SOURCE DEVICE FOR WIRELESS DISPLAY

(71) Applicant: QUALCOMM Incorporated, San Diego, CA (US)

(72) Inventors: Soham V. Sheth, San Diego, CA (US); Samir Salib Soliman, Poway, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 764 days.

(21) Appl. No.: 13/947,852

(22) Filed: Jul. 22, 2013

(65) Prior Publication Data

US 2015/0023648 A1 Jan. 22, 2015

(51) Int. Cl.
| | |
|---|---|
| *H04N 19/40* | (2014.01) |
| *H04N 5/775* | (2006.01) |
| *H04L 29/06* | (2006.01) |
| *H04N 21/2662* | (2011.01) |
| *H04N 21/2343* | (2011.01) |
| *H04N 21/258* | (2011.01) |
| *H04N 21/4402* | (2011.01) |

(52) U.S. Cl.
CPC ........... *H04N 5/775* (2013.01); *H04L 65/607* (2013.01); *H04N 19/40* (2014.11); *H04N 21/2343* (2013.01); *H04N 21/234309* (2013.01); *H04N 21/25825* (2013.01); *H04N 21/25833* (2013.01); *H04N 21/25858* (2013.01); *H04N 21/2662* (2013.01); *H04N 21/4402* (2013.01); *H04N 21/440218* (2013.01)

(58) Field of Classification Search
CPC ............ H04N 19/40; H04N 21/25825; H04N 21/234309; H04N 21/2343; H04N 21/2662

See application file for complete search history.

(56) References Cited

U.S. PATENT DOCUMENTS

| | | |
|---|---|---|
| 7,111,058 B1 * | 9/2006 | Nguyen ............... H04N 21/658 375/E7.016 |
| 8,102,849 B2 | 1/2012 | Martinez Bauza et al. |
| 8,429,299 B2 | 4/2013 | Chan et al. |
| 9,088,634 B1 * | 7/2015 | Corley .................. H04L 65/605 |

(Continued)

OTHER PUBLICATIONS

International Search Report and Written Opinion from International Application No. PCT/US2014/045753, dated Jan. 8, 2015, 13 pp.

(Continued)

*Primary Examiner* — Robert Hance
(74) *Attorney, Agent, or Firm* — Shumaker & Sieffert, P.A.

(57) ABSTRACT

This disclosure relates to techniques for resource utilization in a source device when transmitting video data in a Wireless Display (WD) system. A method for wireless display of compressed content may comprise determining, by a source device, a decoding capability of a sink device, receiving, by the source device, a request to display compressed content at the sink device in a wireless display session, and in the case that the decoding capability of the sink device allows for decoding of the compressed content, transmitting the compressed content from the source device to the sink device, whereby transcoding the compressed content is avoided in the source device.

24 Claims, 8 Drawing Sheets

(56) References Cited

U.S. PATENT DOCUMENTS

| | | | |
|---|---|---|---|
| 2004/0004630 A1 | 1/2004 | Kalva et al. | |
| 2004/0098463 A1* | 5/2004 | Shen | G06F 17/30902 709/213 |
| 2006/0203758 A1 | 9/2006 | Tee et al. | |
| 2006/0282855 A1* | 12/2006 | Margulis | G06F 3/1431 725/43 |
| 2007/0044132 A1* | 2/2007 | Kubo | H04N 7/1675 725/116 |
| 2008/0263621 A1 | 10/2008 | Austerlitz et al. | |
| 2012/0042252 A1 | 2/2012 | Neerudu et al. | |
| 2012/0140018 A1* | 6/2012 | Pikin | H04L 65/605 348/14.02 |
| 2012/0306921 A1 | 12/2012 | Bushell et al. | |

OTHER PUBLICATIONS

Second Written Opinion from International Application No. PCT/US2014/045753, dated Jun. 25, 2015, 7 pp.

International Preliminary Report on Patentability from International Application No. PCT/US2014/045753, dated Sep. 24, 2015, 8 pp.

Response to Second Written Opinion dated Jun. 25, 2015 from International Application No. PCT/US2014/045753, filed on Aug. 25, 2015, 5 pp.

\* cited by examiner

METHOD AND APPARATUS FOR RESOURCE UTILIZATION IN A SOURCE DEVICE FOR WIRELESS DISPLAY

TECHNICAL FIELD

The disclosure relates to the transport and playback of media data for wireless display.

BACKGROUND

Wireless display (WD) systems include a source device and one or more sink devices. A source device may be a device that is capable of transmitting media content within a wireless local area network. A sink device may be a device that is capable of receiving and rendering media content. In some examples, a device may be both a source device and a sink device. The source device and the sink device may be either mobile devices or wired devices. As mobile devices, for example, the source device and the sink devices may comprise mobile telephones, portable computers with wireless communication cards, personal digital assistants (PDAs), portable media players, digital image capturing devices, such as cameras or camcorders, or other devices with wireless communication capabilities, including so-called "smart" phones and "smart" pads or tablets, or other types of wireless communication devices. As wired devices, for example, the source device and the sink device may comprise televisions, desktop computers, monitors, projectors, printers, set top boxes, gaming consoles, routers, and digital video disc (DVD) players, and media servers.

A source device may send media data, such as audio video (AV) data, to one or more sink devices participating in a particular media share session. The media data may be played back at both a local display of the source device and at each of the displays of the sink devices. More specifically, each of the participating sink devices may render the received media data for presentation on an associated screen and audio equipment. In some cases, a user of a sink device may apply user inputs to the sink device, such as touch inputs and remote control inputs, to control the content being displayed at the sink device.

In other examples, the source device may transmit AV data to a sink device, which is then only played back on the sink device. In still other examples, the source may transmit AV data to a source device to be displayed on the sink device, while the source device plays back different AV data on the source device.

SUMMARY

In general, this disclosure relates to techniques for resource utilization in a source device when transmitting video data in a Wireless Display (WD) system.

In one example, this disclosure describes a method for wireless display of compressed content comprising determining, by a source device, a decoding capability of a sink device, receiving, by the source device, a request to display compressed content at the sink device in a wireless display session, and in the case that the decoding capability of the sink device allows for decoding of the compressed content, transmitting the compressed content from the source device to the sink device, whereby transcoding the compressed content is avoided in the source device.

In another example, this disclosure describes a method for wireless display of compressed content comprising monitoring a wireless display session, detecting a triggering event regarding the wireless display session, and stopping a transcoding process at a source device for transmitting content to a sink device in response to the triggering event.

The techniques of this disclosure are not limited to a method, and will also be described in terms of a device or an apparatus that is configured to implement the techniques, and in terms of a computer-readable storage medium that stores instructions that upon execution by a processor cause the processor to implement the techniques.

The details of one or more examples of the disclosure are set forth in the accompanying drawings and the description below. Other features, objects, and advantages will be apparent from the description, drawings, and claims.

DETAILED DESCRIPTION

In general, this disclosure relates to techniques for resource utilization in a source device when transmitting video data in a Wireless Display (WD) system. Currently, wireless display protocols (e.g., Wi-Fi display or "WFD), require a wireless display source device (e.g., a mobile phone, tablet computer, laptop computer etc.) to capture the content of a frame buffer of a source device, encode this content, and then transmit the encoded content to a remote sink device (e.g., a monitor, display, television, etc.).

In many instances, a user may desire to playback the same compressed video or other compressed content at both the source device and the sink device at the same time. In this case, the source device may decode the compressed content to the frame buffer for local display. In addition, the source device may also re-encode the decoded content in the frame buffer for transmission to the sink device. Thus, the source device engages in transcoding of the compressed content before transmission to the sink device. Transcoding is expensive in terms of system resource consumption, including power consumption.

Other wireless display techniques may avoid transcoding by streaming compressed content directly from the source device to the sink device. However, such techniques do not allow for local playback or display of the compressed content, as the source device does not decode the compressed content when streaming.

As such, conventional techniques for wireless display require a tradeoff between undesirable consumption of resources needed for transcoding so as to allow for local playback, and the desirability of reduced resource consumption, e.g., by streaming compressed video and disallowing local playback.

In view of these drawbacks, this disclosure proposes wireless display techniques that avoid transcoding in many circumstances, and still allow for local playback on the source device. As such, the techniques of this disclosure may reduce the need to use one or more system resources, including CPU, memory, hardware, and other components that consume power. Accordingly, the techniques may be useful for extending battery life.

Figure 1:
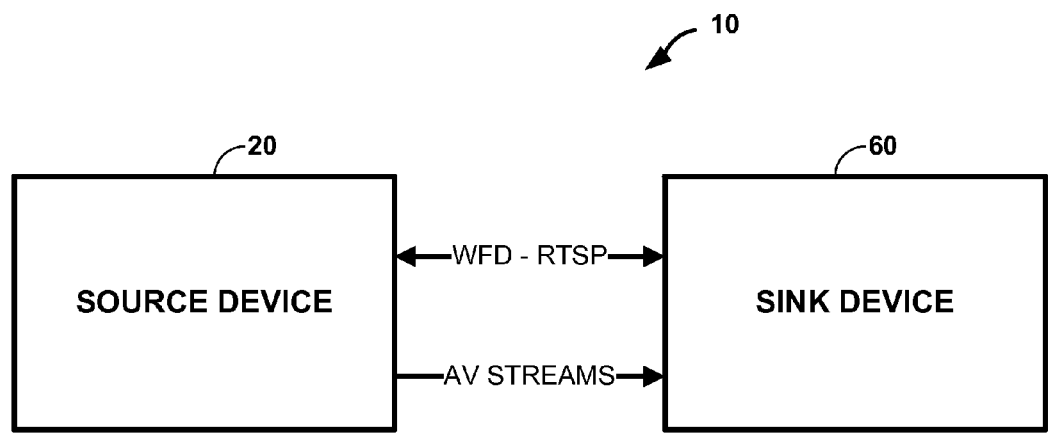
FIG. 1 is a block diagram illustrating a wireless display system that includes a source device and a sink device.

FIG. 1 is a block diagram illustrating a wireless display system that includes a source device and a sink device. Wireless display (WD) system 10 may include source device 20 and sink device 60. Source device 20 may be any type of device capable of wirelessly transmitting audio/visual (AV) data to sink device 60, including a mobile phone, tablet computer, laptop computer, set-top box, etc. Sink device 60 may be any type of device capable of receiving and display AV data from source device 20, including a set-top box, laptop computer, mobile phone, tablet computer, desktop computer, monitor, television, etc.

As shown in FIG. 1, source device 20 may be configured to transmit AV streams to sink device 60. Such AV streams may be compressed video data and/or compressed audio data that are in a format that is decodable by sink device 60. As one example, the AV streams may be compressed according to the H.264 video compression standard. However, any compression techniques may be used. The transmission of the AV streams may be supported through control information. Example protocols for control information of wireless display may include the Wi-Fi Display (WFD) standard and/or a real-time streaming protocol (RTSP).

Figure 2:
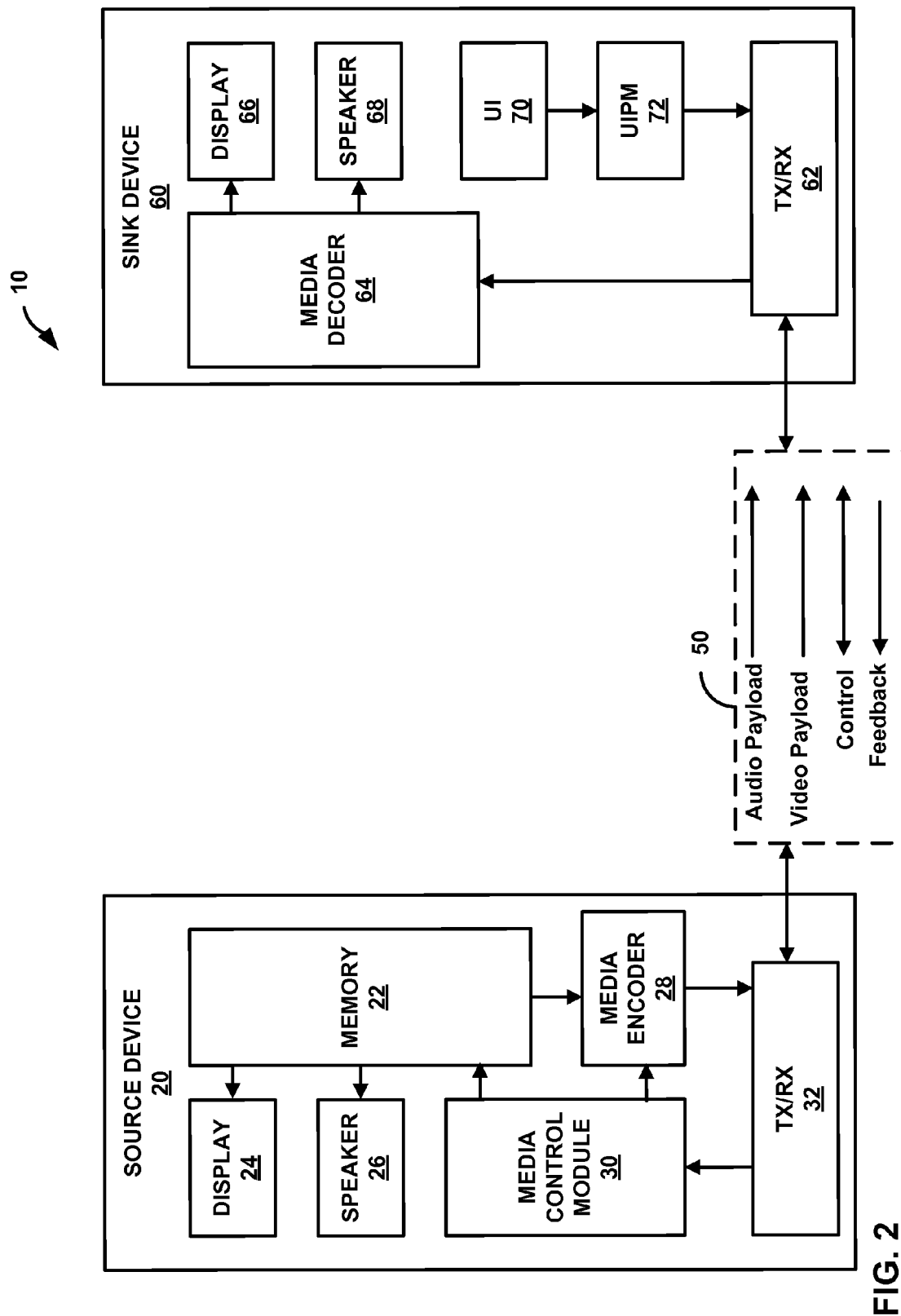
FIG. 2 is a block diagram illustrating a wireless display system in more detail.

FIG. 2 is a block diagram illustrating an example of WD system 10 in greater detail. FIG. 2 and the following figures are provided for purposes of explanation and should not be considered limiting of the techniques as broadly exemplified and described in this disclosure.

As shown in the example of FIG. 2, WD system 10 may include source device 20 and sink device 60. Source device 20 may communicate with sink device 60 via a wireless channel 50. Source device 20 may include memory 22, display 24, speaker 26, media encoder 28, media control module 30, and transmitter/receiver (TX/RX) unit 32. Sink device 60 may include transmitter/receiver unit (TX/RX) 62, media decoder 64, display 66, speaker 68, user input (UI) device 70, and user input processing module (UIPM) 72. The illustrated components constitute merely one example configuration for WD system 10. Other configurations may include fewer components than those illustrated or may include components in addition to those illustrated.

In the example of FIG. 2, source device 20 may be configured to display the video portion of media data on display 24 and can output the audio portion of media data using speaker 26. Media data may be stored locally on memory 22, accessed from an external storage medium such as a file server, a hard drive, an external memory, a Blu-ray disc, a DVD or other physical storage medium, or may be streamed to source device 20 via a network connection such as the Internet. In some instances, media data may be captured in real-time via a camera and microphone of source device 20. Media data may include multimedia content such as movies, television shows, or music, and may also include real-time content generated by source device 20. Such real-time content may, for example, be produced by applications running on source device 20, or captured, e.g., as part of a video telephony session. Such real-time content may, in some instances, include a picture of user input options available for a user to select. In some instances, media data may include pictures that are a combination of different types of content, such as a picture of a movie or TV program that has user input options overlaid on the picture.

In addition to rendering media data locally via display 24 and speaker 26, media encoder 28 of source device 20 can encode media data and TX/RX unit 32 can transmit the encoded media data over wireless channel 50 to sink device 60. In some examples, media encoder 28 may re-encode already encoded media data. In other words, media encoder 28 may transcode media data. TX/RX unit 62 of sink device 60 may receive the encoded media data, and media decoder 64 may decode the encoded media data and output the decoded media data for presentation on display 66 and speaker 68. In this manner, the audio and video data being rendered by display 24 and speaker 26 can be simultaneously rendered by display 66 and speaker 68. The audio data and video data may be arranged in frames, and the audio frames may be time-synchronized with the video frames (i.e., pictures) when rendered.

Media encoder 28 and media decoder 64 may include encoder/decoder (CODEC) units that implement various audio and video compression standards, such as the ITU-T H.264 standard, alternatively referred to as MPEG-4, Part 10, Advanced Video Coding (AVC), or the newly emerging high efficiency video coding (HEVC) standard. Many other types of proprietary or standardized compression techniques may also be used. Generally speaking, media decoder 64 is configured to perform the reciprocal coding operations of media encoder 28. Although not shown in FIG. 2, in some aspects, media encoder 28 and media decoder 64 may each be integrated with an audio encoder and decoder, and may include appropriate MUX-DEMUX units, or other hardware and software, to handle encoding of both audio and video in a common data stream or separate data streams.

Media encoder 28 may also perform other encoding functions in addition to implementing a video compression standard as described above. For example, media encoder 28 may add various types of metadata to media data prior to the media data being transmitted to sink device 60. In some instances, media data may be stored on or received at source device 20 in an encoded form and thus not require further compression by media encoder 28.

Although FIG. 2 shows wireless channel 50 carrying audio payload data and video payload data separately, in some instances, the video payload data and audio payload data may be part of a common data stream, and may be multiplexed or otherwise interleaved with one another. If applicable, MUX-DEMUX units may conform to the ITU H.223 multiplexer protocol, or other protocols such as the user datagram protocol (UDP). Media encoder 28 and media decoder 64 each may be implemented as one or more microprocessors, digital signal processors (DSPs), application specific integrated circuits (ASICs), field programmable gate arrays (FPGAs), discrete logic, software, hardware, firmware or any combinations thereof. In examples where one or more aspects are implemented in software, underlying hardware (e.g., in the form of a programmable processor) may execute the software. Each of media encoder 28 and media decoder 64 may be included in one or more encoders or decoders, either of which may be integrated as part of a combined encoder/decoder (CODEC). Thus, each of source device 20 and sink device 60 may comprise specialized machines configured to execute one or more of the techniques of this disclosure.

Display 24 and display 66 may comprise any of a variety of video output devices such as a cathode ray tube (CRT) display, a liquid crystal display (LCD), a plasma display, a light emitting diode (LED) display, an organic light emitting diode (OLED) display, or another type of display device. In these or other examples, display 24 and 66 may each be emissive displays or transmissive displays. Display 24 and display 66 may also be touch displays such that they are simultaneously both input devices and display devices. Such touch displays may be capacitive, resistive, or other types of touch panel that allows users to provide user input to the respective devices.

Speaker 26 and speaker 68 may comprise any of a variety of audio output devices such as headphones, single-speaker systems, multi-speaker systems, or surround sound systems. Additionally, although display 24 and speaker 26 are shown as part of source device 20 and display 66 and speaker 68 are shown as part of sink device 60, source device 20 and sink device 60 may in fact be a system of devices. As one example, display 66 may be a television, speaker 68 may be a surround sound system, and media decoder 64 may be part of an external box connected, either wired or wirelessly, to display 66 and speaker 68. In other instances, sink device 60 may be a single device, such as a tablet computer or smartphone. In still other cases, source device 20 and sink device 60 are similar devices, e.g., both being smartphones, tablet computers, or the like. In this case, one device may operate as the source and the other may operate as the sink. These roles may be reversed in subsequent communication sessions. In still other cases, source device 20 may comprise a mobile device, such as a smartphone, laptop or tablet computer, and sink device 60 may comprise a more stationary device (e.g., with an AC power cord), in which case source device 20 may deliver audio and video data for presentation to a one or more viewers via sink device 60.

TX/RX unit 32 and TX/RX unit 62 may each include various mixers, filters, amplifiers and other components designed for signal modulation, as well as one or more antennas and other components designed for transmitting and receiving data. Wireless channel 50 generally represents any suitable communication medium, or collection of different communication media, for transmitting media data, control data and feedback between source device 20 and sink device 60. Wireless channel 50 is usually a relatively short-range communication channel, and may implement a physical channel structure similar to Wi-Fi, Bluetooth, or the like, such as implementing defined 2.4, GHz, 3.6 GHz, 5 GHz, 60 GHz or Ultrawideband (UWB) frequency band structures. However, wireless channel 50 is not necessarily limited in this respect, and may comprise a wireless communication medium, such as a radio frequency (RF) spectrum or one or more physical transmission lines, or a combination of wireless and wired media. In other examples, wireless channel 50 may even form part of a packet-based network, such as a wired or wireless local area network, a wide-area network, or a global network such as the Internet. Additionally, wireless channel 50 may be used by source device 20 and sink device 60 to create a peer-to-peer link.

Source device 20 and sink device 60 may establish a communication session according to a capability negotiation using, for example, Real-Time Streaming Protocol (RTSP), Real-Time Transport Protocol (RTP), or RTP Control Protocol (RTCP) control messages. In one example, a request to establish a communication session may be sent by source device 20 to sink device 60. Once the communication session is established, source device 20 may transmit media data, e.g., audio video (AV) data, to sink device 60. Source device 20 may transmit media data to sink device 60, for example, using the Real-time Transport protocol (RTP). Sink device 60 may render the received media data on display 66 and speaker 68.

Source device 20 and sink device 60 may communicate over wireless channel 50 using a communications protocol such as a standard from the IEEE 802.11 family of standards. In one example, wireless channel 50 may be a network communication channel. In this example, a communication service provider may centrally operate and administer the network using a base station as a network hub. Source device 20 and sink device 60 may, for example, communicate according to the Wi-Fi Direct or Wi-Fi Display (WFD) standards, such that source device 20 and sink device 60 may communicate directly with one another without the use of an intermediary such as a wireless access point or a so-called hotspot. Relatively short distance in this context may refer to, for example, less than approximately seventy meters, although in a noisy or obstructed environment, the distance between devices may be even shorter, such as less than approximately thirty-five meters, or less than approximately twenty meters.

The techniques of this disclosure may at times be described with respect to WFD and/or RTSP, but it is contemplated that aspects of these techniques may also be compatible with other communication protocols. By way of example and not limitation, the wireless communication between source device 20 and sink device 60 may utilize orthogonal frequency division multiplexing (OFDM) techniques. A wide variety of other wireless communication techniques may also be used, including but not limited to time division multiple access (TDMA), frequency division multiple access (FDMA), code division multiple access (CDMA), or any combination of OFDM, FDMA, TDMA and/or CDMA.

In addition to decoding and rendering media data received from source device 20, sink device 60 can also receive user inputs from user input device 70. User input device 70 may, for example, include a keyboard, mouse, electronic pen, trackball or track pad, touch screen, voice command recognition module, or any other such user input device. UIPM 72 may format user input commands received by user input device 70 into a data packet structure that source device 20 is capable of processing. Such data packets may be transmitted by TX/RX unit 62 to source device 20 over wireless channel 50.

TX/RX unit 32 may receive the data packets, and media control module 30 may parse the data packets to interpret the user input command that was received by user input device 70. Based on the user input command received in the data packet, media control module 30 may change the media content being encoded and transmitted. In this manner, a user of sink device 60 can control the media data being transmitted by source device 20 remotely and without directly interacting with source device 20.

Additionally, users of sink device 60 may be able to launch and control applications on source device 20. As an illustration, a user of sink device 60 may able to launch a photo editing application stored on source device 20 and use the application to edit a photo that is stored locally on source device 20. Sink device 60 may present a user with a user experience that looks and feels like the photo is being edited locally on sink device 60 while in fact the photo is being edited on source device 20. Using such a configuration, a user may be able to leverage the capabilities of one device for use with several devices. For example, source device 20 may comprise a smartphone with a large amount of memory and high-end processing capabilities. When watching a movie, however, the user may wish to watch the movie on a device with a bigger display screen, in which case sink device 60 may be a tablet computer or even larger display device or television. When wanting to send or respond to email, the user may wish to use a device with a physical keyboard, in which case sink device 60 may be a laptop. In both instances, the bulk of the processing may still be performed by source device 20 even though the user is interacting with sink device 60. Source device 20 and sink device 60 may facilitate two way interactions by transmitting control data, such as, data used to negotiate and/or identify the capabilities of the devices in any given session over wireless channel 50.

In some configurations, media control module 30 may comprise an operating system process being executed by one or more processors of source device 20. In other configurations, media control module 30 may comprise a software process of an application running on source device 20. In such a configuration, the user input command may be interpreted by the software process, such that a user of sink device 60 is interacting directly with the application running on source device 20, as opposed to the operating system running on source device 20. By interacting directly with an application as opposed to an operating system, a user of sink device 60 may have access to a library of commands that are not native to the operating system of source device 20. Additionally, interacting directly with an application may enable commands to be more easily transmitted and processed by devices running on different platforms.

User inputs applied at sink device 60 may be sent back to source device 20 over wireless channel 50. In one example, a reverse channel architecture, also referred to as a user interface back channel (UIBC) may be implemented to enable sink device 60 to transmit the user inputs applied at sink device 60 to source device 20. The UIBC architecture may include upper layer messages for transporting user inputs, and lower layer messages for negotiating user interface capabilities at sink device 60 and source device 20. The UIBC may reside over the Internet Protocol (IP) transport layer between sink device 60 and source device 20. In this manner, the UIBC may be above the transport layer in the Open System Interconnection (OSI) communication model. To promote reliable transmission and in-sequence delivery of data packets containing user input data, UIBC may be configured to run on top of other packet-based communication protocols such as the transmission control protocol/internet protocol (TCP/IP) or the user datagram protocol (UDP). UDP and TCP may operate in parallel in the OSI layer architecture. TCP/IP may enable sink device 60 and source device 20 to implement retransmission techniques in the event of packet loss.

Figure 3:
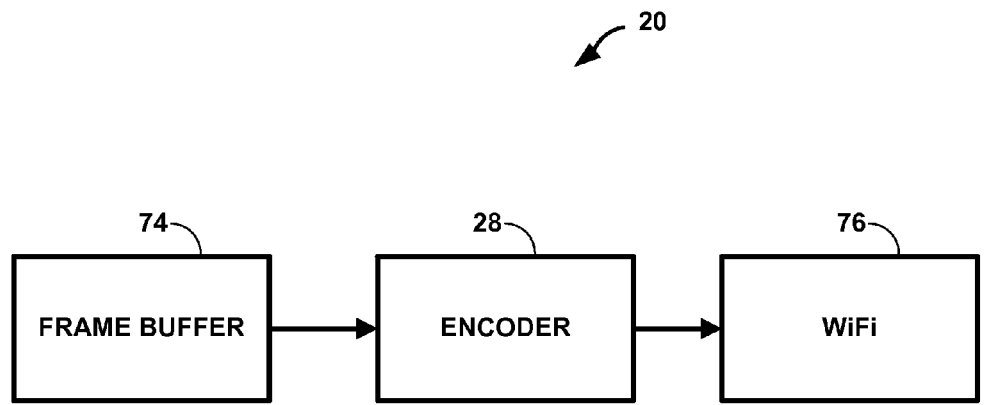
FIG. 3 is a block diagram showing transcoding in a source device.

FIG. 3 is a block diagram showing transcoding in a source device. As explained above, conventional wireless display techniques, such as WFD, capture the content of framebuffer 74 of source device 20. Framebuffer 74 may be a portion of memory 22 as shown in FIG. 2. Framebuffer 74 stores pixel information that is displayed at display 24. Source device 20 would then encode the contents of framebuffer 74 using encoder 20 and then transmit that encoded data to sink device 60. In the example of FIG. 3, the transmission is accomplished by using WiFi module 76. WiFi module 76 may be part of TX/RX unit 32 shown in FIG. 2, and may be configured to transmit data using WiFi techniques.

As explained above, in many circumstances, the contents of framebuffer 74 may have been previously decoded by source device 20. For example, source device 20 may have decoded compressed video data (e.g., H.264 video data) that was stored locally or streamed to source device 20. This decoded data in framebuffer 74 is then re-encoded (i.e., transcoded) for transmission to sink device 60 in a wireless display application. Such a transcoding operation consumes system resources and may increase power/battery consumption at source device 20.

Figure 4:
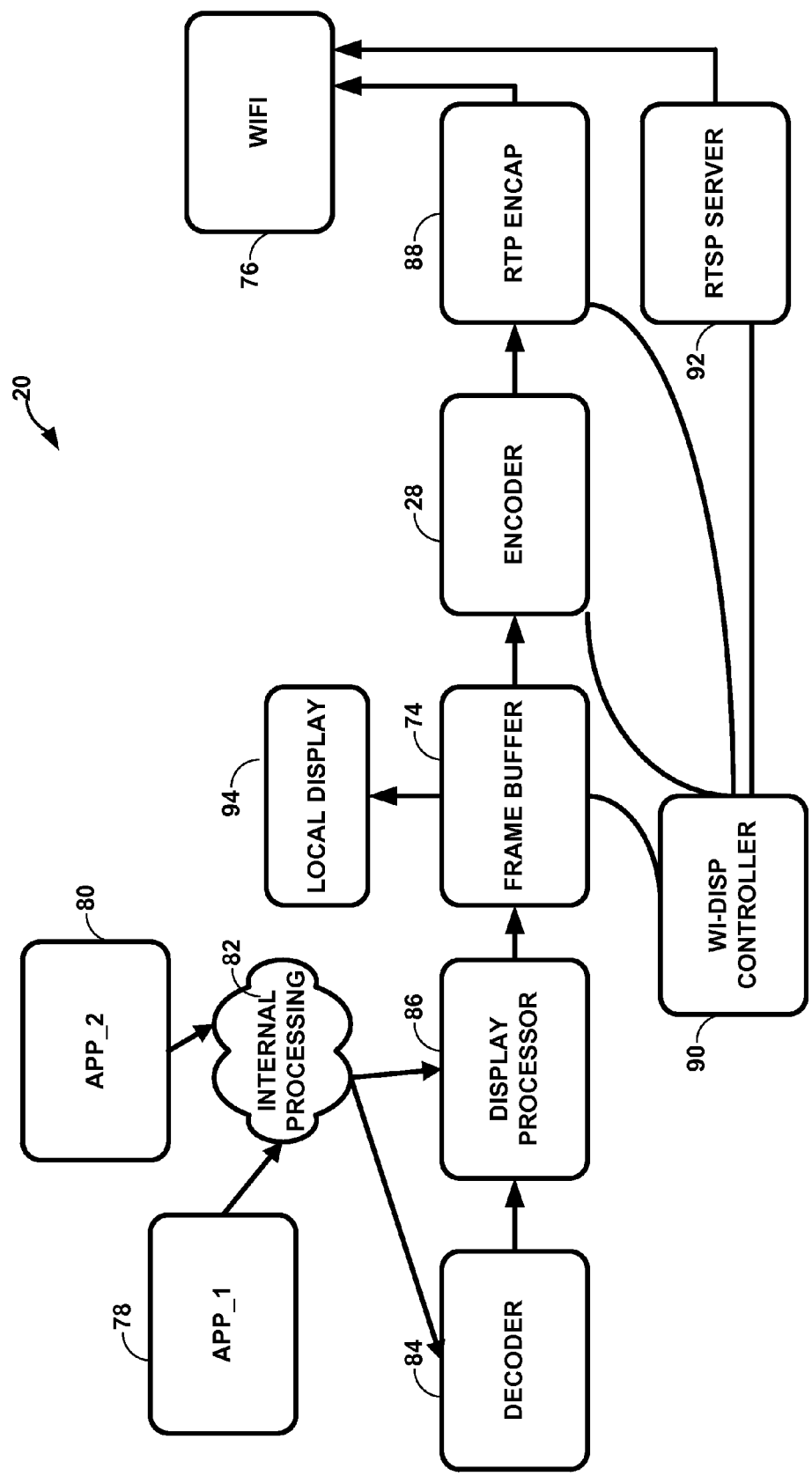
FIG. 4 is a block diagram showing an example of a source device.

FIG. 4 is a block diagram showing an example of a conventional source device, and transcoding in more detail. In the example of FIG. 4, source device 20 includes decoder 84, display processor 86, frame buffer 74, encoder 20, wireless display controller 90, RTP encapsulation unit 88, RTSP server 92, and Wi-Fi unit. Source device 20 may be configured to execute one or more applications (e.g., App_1 78 and App_2 80) on one more or processing units (represented by internal processing 82).

A user of source device 20 may cause an application (e.g., App_1 78 or App_2 80) to be executed on one or more processing units (e.g., App_1 78 and App_2 80). Such applications may interact with display 86 78 and internal processing 82 to cause pixels to be produced and stored in frame buffer 74. Such pixels may be displayed on local display 94. Such pixels contents may include graphical user interfaces, windows, rendered graphics, text, images, or any other type of visual material that may be produced by one or more processing units of source device 20 (e.g., a central processing unit, graphics processing unit, digital signal processor, etc.).

In additional, internal processing unit 82 may cause decoder 84 to decode compressed content that may be processed by display processor 86 and stored in frame buffer 74. In one example, the compressed content may be video data. Examples of compression methods for video may include H.263, H.264, H.264/AVC (advanced video coding), High Efficiency Video coding (HEVC), or other video compression standards. Compressed video data may be stored locally at source device 20 or may be accessed (e.g., streamed) to source device 20 through a network (e.g., the Internet).

In the case a wireless display session is initiated on source device 20, wireless display controller 90 coordinates with encoder 20, RTP encapsulation unit 88 and RTSP server unit 92 to produce data in a format that is decodable by a sink device. In one example, wireless display controller 90 may instruct encoder 20 to retrieve the content of frame buffer 74 and encode such data. Encoder 20 encodes the data in a format that is decodable by the sink device. In the WFD standard, the H.264 codec is used for encoding the contents of the frame buffer, however, any encoding scheme may be used. In typical examples, encoder 28 may be configured to encoded two logical streams, as applicable. One stream for video and/or image content, and one stream for audio content. As can be seen, in situations where the content of frame buffer 74 was produced by decoding compressed content with decoder 84, the re-encoding of the frame buffer contents by encoder 28 amounts to a transcoding process.

Once the contents of frame buffer 74 have been encoded, wireless display further coordinates with RTP encapsulation unit 88 and RTSP server 92 to control the packaging and timing of the encoded content. RTP encapsulation unit 88 packages the encoded content for wireless transmission. For example, RTP encapsulation unit 88 may be configured to encapsulate the encoded content according to the RTP standard. RTSP server unit 92 is configured to control the ongoing session with a sink device. For example, RTSP server unit 92 may use the TCP/IP protocol stack and underlying WiFi transceiver 76 to manage the ongoing wireless display session with sink devices. WiFi transceiver 76 may be configured to transmit data according to the IEEE 802.11 standard. However, any type of wireless transmission techniques may be used.

Figure 5:
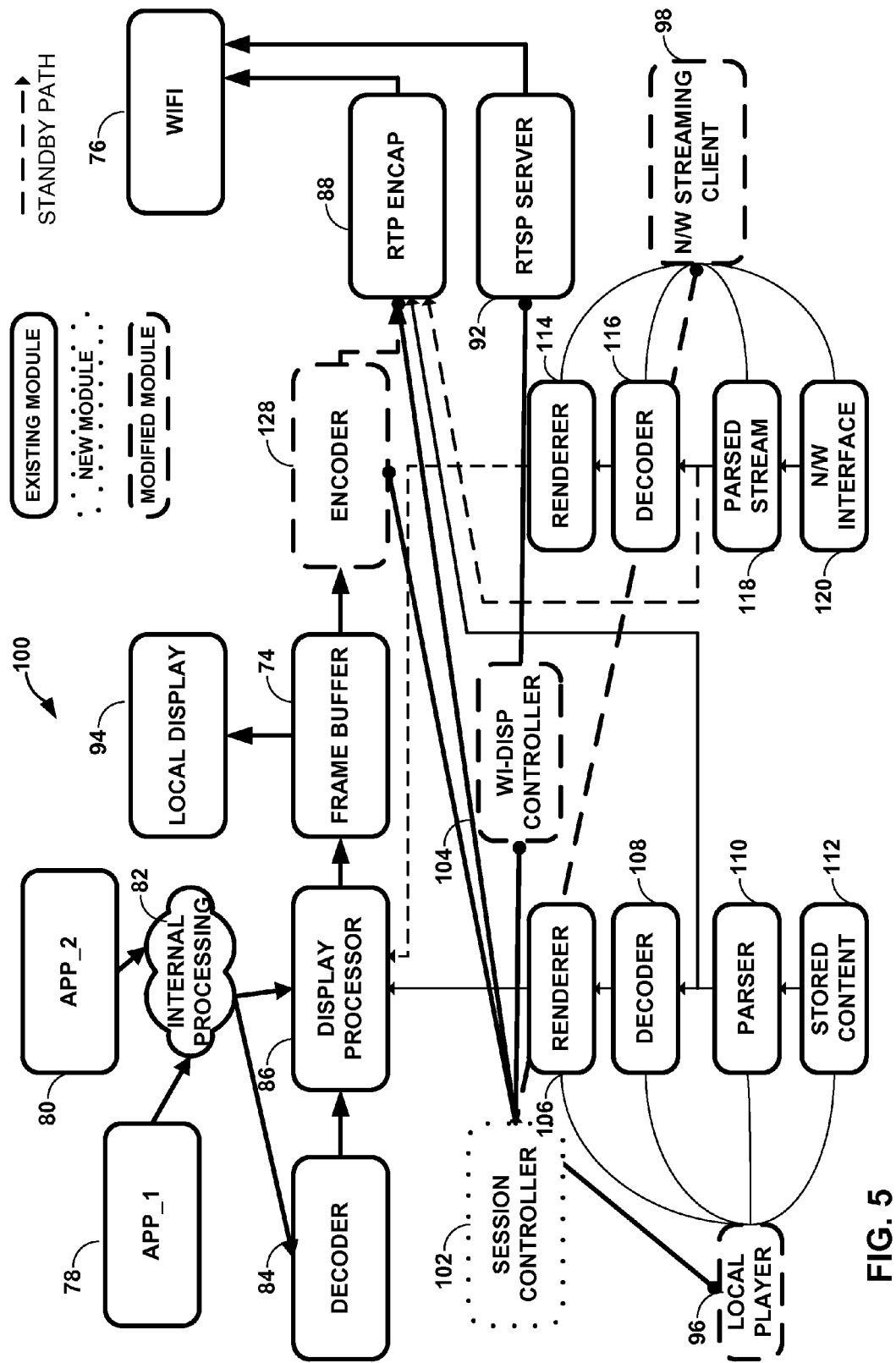
FIG. 5 is a block diagram showing an example of a source device configured to implement the techniques of the disclosure.

FIG. 5 is a block diagram showing an example of a source device configured to implement the techniques of the disclosure. In particular, this disclosure provides techniques for wireless display transmission and local playback in a source device without the use of transcoding. FIG. 5 shows a source device 100 with additional and modified modules relative to source device 20 described in FIG. 4. Units shown in FIG. 5 that have the same numerical identifiers in FIG. 4 operate in the same manner as discussed above. The new and modified units of source device 100 will be discussed below.

To avoid transcoding of compressed content, source device 100 includes session controller 102. Session controller 102 is configured to dynamically manage a wireless display session and avoid transcoding of compressed content. In particular, session controller 102 may be configured to control various other units of source device to avoid transcoding in situations where a desired sink device is known to have the capability needed for decoding the compressed content. In one example, session controller 102 may be configured to determine the decoding capability of a sink device. That is, session controller 102 is configured to determine what compression formats a sink device is capable of decoding.

In one example, such a determination may be made from a list of decodable formats stored at the source device. The source device may have acquired this format information during a wireless display session setup with the sink device. For example, source device 100 may store a list of compression formats that are decodable by sink devices that are compatible with a particular wireless display protocol. For example, sink devices compatible with the WFD protocol may be able to decoded content compressed according to the H.264 standard. A sink device may be capable of decoding video according to any video coding standard, including, but not limited to, high efficiency video coding (HEVC), H.261, H.262, H.263, MPEG-2, MPEG-4, MPEG-4/AVC, JPEG 2000, VP8, VP9, and the like.

In other example, session controller 102 may be configured to exchange control information on-fly (e.g., through WiFi unit 76) to determine the decoding capability of the sink device. That is, a sink device may exchange information with source device 100 that indicates which compression formats are decodable by the sink device.

In some examples, session controller 102 may continuously or intermittently attempt to determine the decoding capability of sink devices. For example, session controller 102 may attempt to exchange decoding capability information with any sink devices in range of WiFi unit 76 of source device 100. In other examples, session controller 102 may monitor internal triggers to initiate an attempt to determine the decoding capability of a sink device in response. The internal trigger may be request (e.g., a software request or user request) to establish a wireless display connection with a sink device. In particular, session controller 102 may attempt to determine the decoding capability of a sink device when the wireless display session includes displaying compressed content.

Regardless of the method of determining the coding capability of the sink device, session controller 102 is configured to effect the transmission of compressed content from the source device to the sink device directly (i.e., without transcoding) in the case that the determined decoding capability of the sink device allows for decoding of the compressed content.

Upon determining the decoding capability of the sink device, session controller 102 is configured to monitor and control the operation of wireless display controller 104, local player 96, network streaming client 98, and encoder 128 to transmit encoded data to the sink device, if possible, without transcoding.

First, consider the situation where the request to initiate a wireless display session involves the transmission and display of locally stored content 112 produced through local player application 96. Local player 96 is an application configured to decode or direct the decoding of locally stored content 112. In the example of FIG. 5, local content 112 is compressed content stored in a local memory (e.g., memory 22 of FIG. 2). For local playback in source device 100, local player 96 would instruct parser 110 to parse stored content 112. Parser 110 processes the content stored, and based on the meta-data present, generates one or more streams of parsed content to represent video and/or audio content. The parsed content would then be decoded by decoder 108 and rendered to display processor 86 by renderer 106. Renderer 106 provides decoded content and relevant information for rendering the decoded content to display processor 86. Display processor 86 would then take the decoded and rendered content and produce the pixels for storage in frame buffer 74.

If session controller 102 determines that the sink device is not capable of decoding stored content 112, session controller 102 may instruct wireless display controller 104, RTSP server 92 and encoder 128 to encode and transmit the content of frame buffer 74 (i.e., the compressed content is transcoded). Encoder 128 is configured to encode the content of the framebuffer in a format that is decodable by the sink device. However, if session controller 102 has determined that the sink device is capable of decoding stored content 112, rather than re-encoding the content of frame buffer 74 using encoder 128, session controller 102 may instruct wireless display controller 104 and RTSP server 92 to stream parsed content to the sink device directly. That is, parsed content is passed to RTP encapsulation unit 88 without being decoded. As shown in FIG. 5, stored content 112 is directed to RTP encapsulation unit 88 after being parsed by parser 110. This may be referred to as a parsed packet tap out mode. In other examples, stored content may be directed to RTP encapsulation unit 88 without first being parsed.

Session controller 102 may also be configured to continually monitor the wireless display session for triggers that may alter how content is routed to the sink device. That is, session controller 102 may monitor the state and/or actions of local player 96 and/or or wireless displayer controller 104. If a change in state or certain actions occurs, session controller 102 may direct source device 100 to return to a frame buffer (FB) mode, whereby encoder 128 encodes the contents of frame buffer 74 for transmission to the sink device. For example, if a user stops playback of compressed content by local player 96, and instead wishes to display other content (e.g., uncompressed content, or content not decodable by the sink device), session controller 102 may detect such an action and instruct wireless display controller 104 and RTSP server 102 to transmit the frame buffer content encoded by encoder 128. As shown in FIG. 5, the output of encoder 128 is shown with a dashed line indicating a standby path. That is, session controller 102 is configured to preferably transmit content to the sink device without transcoding, but may switch to transcoding in FB mode, if needed.

Likewise, if source device 100 is engaged in wireless display session in FB mode, but session controller 102 detects that compressed content that is decodable by the sink device is to be transmitted and displayed, session controller 102 may direct wireless display controller 104 and RTSP server 92 to discontinue FB mode, and instead encapsulate and transmit such content directly, without transcoding.

The above-techniques may also be utilized when the compressed content to be shared over the wireless display session is not stored locally, but rather, is received (e.g., streamed) at source device 100 from a network source (e.g., the Internet). For example, as shown in FIG. 5, network streaming client 98 may be configured to receive and playback compressed content streamed to source device 100 through network interface 120. Like local player 96, network streaming client 98 may generate parsed stream 118 and use decoder 116 and renderer 114 to decode the compressed content and supply such decoded content to display processor 86 for eventual display at local display 94.

Like above, first consider the situation where the request to initiate a wireless display session involves the transmission and display of content first streamed to source device 100 through network interface 120 and decoded at the direction of network streaming client 98. For local display in source device 100, network streaming client 98 may receive the parsed stream content from network interface 120 and handle at parsed stream 118. The parsed stream may then be decoded by decoder 116 and rendered to display processor 86 by renderer 114. Display processor 86 may then take the decoded and rendered content and produce the pixels for storage in frame buffer 74.

If session controller 102 determines that the sink device is not capable of decoding the compressed content received by network streaming client 98, session controller 102 may instruct wireless display controller 104, RTSP server 92 and encoder 128 to encode and transmit the content of frame buffer 74 (i.e., the compressed content is transcoded). However, if session controller 102 determines that the sink device is capable of decoding the content received through network stream client 98, rather than re-encoding the content of frame buffer 74 using encoder 128, session controller 102 may instruct wireless display controller 104 and RTSP server 92 to stream the compressed content received at network interface 120 to the sink device directly. That is, the compressed content received at network interface 120 may be directed to RTP encapsulation unit 88 without being decoded. As shown in FIG. 5, parsed stream 118 is directed to RTP encapsulation unit 88. Again, this may be referred to as a "parsed packet tap out" mode. In other examples, the compressed content received at network interface 120 may be directed to RTP encapsulation unit 88 without first being parsed.

Like above, session controller 102 may also be configured to continually monitor the wireless display session for triggers that may alter how content is routed to the sink device. That is, session controller 102 may monitor the state and/or actions of network streaming client 98 and/or wireless display controller 104. If a change in state or certain actions occurs, session controller 102 may direct source device 100 to return to a frame buffer (FB) mode, whereby encoder 128 encodes the contents of frame buffer 74 for transmission to the sink device. For example, if a user stops playback of compressed content received through network streaming client 98, and instead wishes to display other content (e.g., uncompressed content, or content not decodable by the sink device), session controller 102 may detect such an action and instruct wireless display controller 104 and RTSP server 102 to transmit the frame buffer content encoded by encoder 128.

Triggers used to start/stop a transcoding process in a wireless display session may be spread among multiple modules in a source device. Such triggers may include detection of video/audio decoder initialization, loading of a compressed file, loading or a parser module, loading of a display driver, and or use of a display processor. A source device may use a single trigger and/or a combination of multiple triggers.

Figure 6:
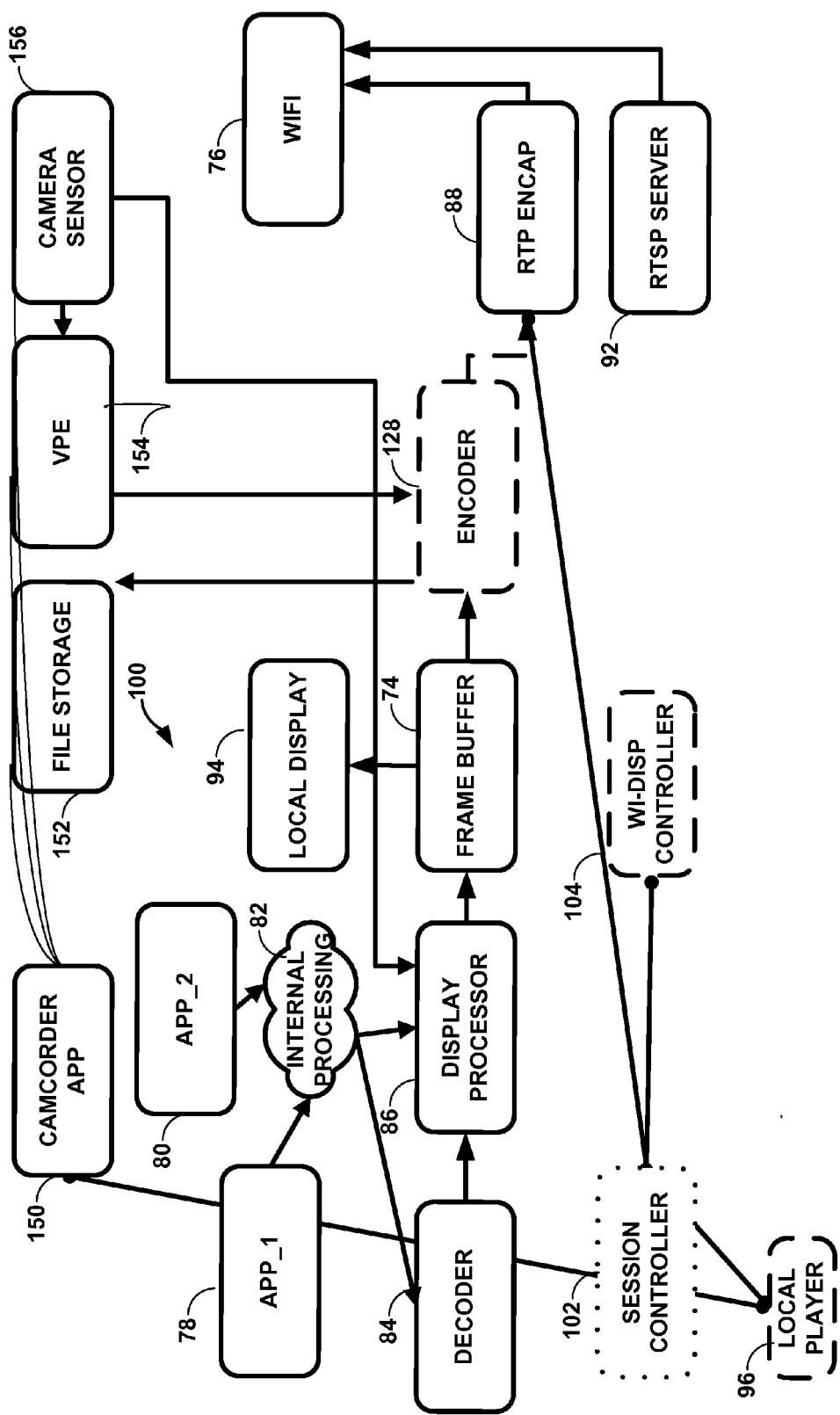
FIG. 6 is a block diagram showing an example of a source device configured to implement the techniques of the disclosure.

FIG. 6 is a block diagram showing an example of a source device configured to implement the techniques of the disclosure. In the example of FIG. 6, a system for extending the techniques of this disclosure to function with a video capture device (e.g., a camcorder) are discussed. As shown in FIG. 6, source device 100 may further include a camcorder app 150 configured to control the operation of a video capture device, which may include camera sensor 156, video processing engine (VPE) 154, and file storage 152. Camera sensor 156 may be any type of camera sensor capable of capturing light for producing a video. VPE 154 is a processor that converts that captured signal from camera sensor 156 and creates an uncompressed video stream.

In current wireless display techniques using a camcorder, if a user wants to use camcorder, the user must stop a wireless display session. The user can't send a live video stream captured by a camcorder to a remote display if there is only one encoder at the source device. As such, either user has to stop the wireless display session or multiple encoders must be included in the source device.

To address this drawback, this disclosure proposes a technique whereby session controller 102 coordinated with camcorder app 150. If a user starts video recording with camcorder app 100, session controller 102 will instruct Wi-Disp controller 104 to stop encoding the content from frame buffer 74. Instead, encoder 128 will be allocated for camcorder processing. This way, captured video will get encoded and stored into file storage 152. Whereas, Wi-Disp controller 104 (or similar module) may tap the output of encoder 128 and send it to a remote display (i.e., a sink device). In one example, session controller 102 may be configured to control camcorder app 150 to select the encoding format (e.g., H.264, etc.) that the sink device also supports. A local display path may take the normal course.

This approach helps with reducing need for number of hardware and/or software codecs needed at a source device, avoiding the forceful need to stop the wireless display session if user invokes a video capture (e.g., camcorder) application, and saves processing resources including battery life.

Figure 7:
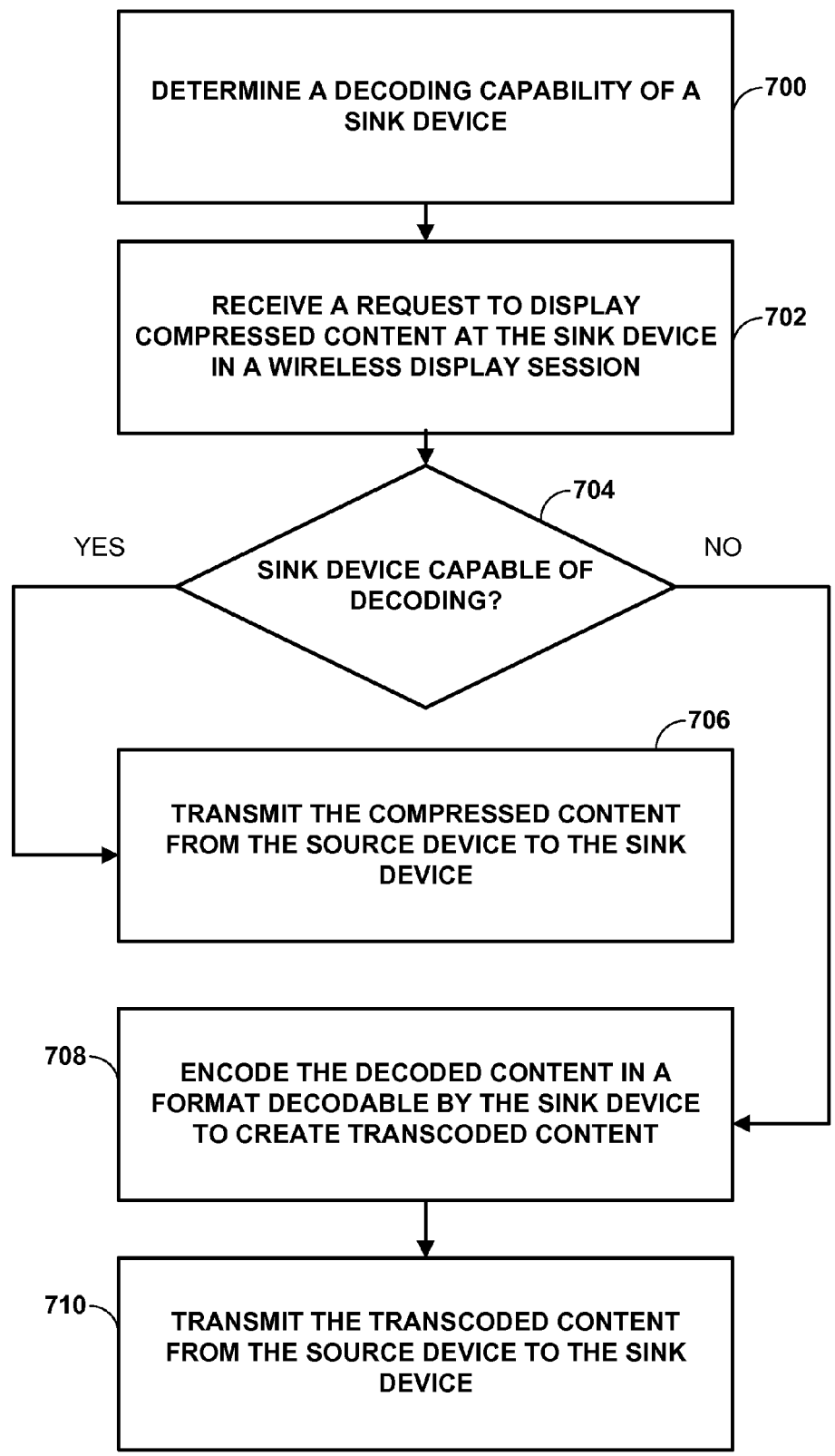
FIG. 7 is a flowchart depicting an example method of the disclosure.

FIG. 7 is a flowchart depicting an example method of the disclosure. The techniques of FIG. 7 may be executed by one or more hardware and/or software units of a source device, including session controller 102 of source device 100.

In one example of the disclosure, source device 100 may be configured to determine a decoding capability of a sink device (700), and receive a request to display compressed content at the sink device in a wireless display session (702). In the case that the decoding capability of the sink device allows for decoding of the compressed content (704), source device 100 is further configured to transmit the compressed content from the source device to the sink device (706), whereby transcoding the compressed content is avoided in the source device. That is, if transcoding were occurring previously for the wireless display session, source device 100 would be configured to stop a transcoding process at the source device for transmitting the compressed content to the sink device in the case that the decoding capability of the sink device allows for decoding of the compressed content.

In some examples, source device 100 may be further configured to playback the compressed content locally. In this case, source device 100 may be further configured to decode the compressed content at the source device to create decoded content, store the decoded content at the source device, and display the decoded content at the source device substantially simultaneously with display of the compressed content transmitted to the sink device.

In the case that the decoding capability of the sink device does not allow for decoding of the compressed content (704), source device 100 may be further configured to encode the decoded content in a format decodable by the sink device to create transcoded content (708), and transmit the transcoded content from the source device to sink device (710).

Figure 8:
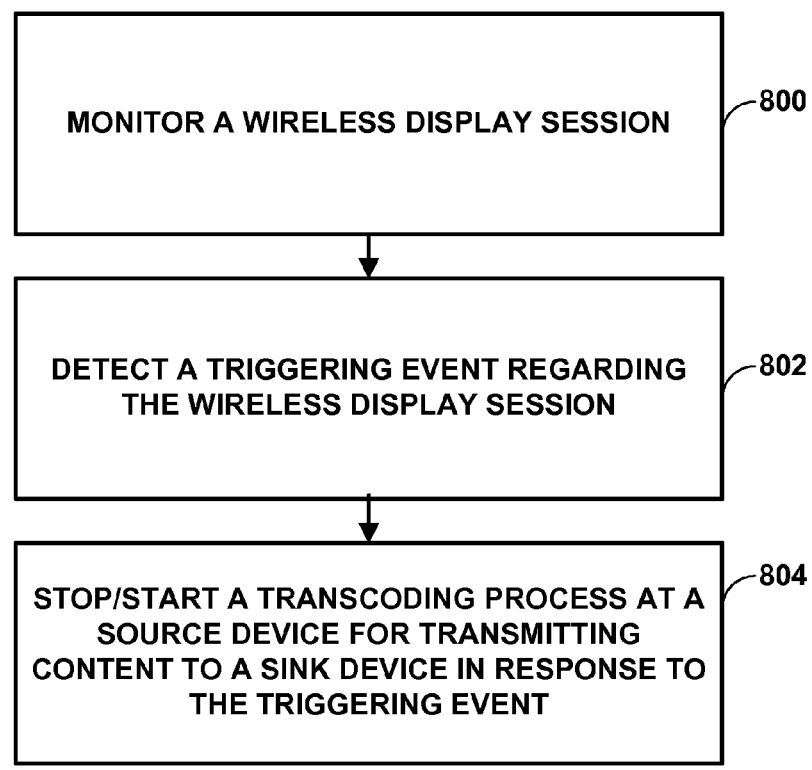
FIG. 8 is a flowchart depicting an example method of the disclosure.

FIG. 8 is a flowchart depicting another example method of the disclosure. Again, the techniques of FIG. 8 may be executed by one or more hardware and/or software units of a source device, including session controller 102 of source device 100.

In one example, source device 100 may be configured to monitor a wireless display session (800), and detect a triggering event regarding the wireless display session (802). In some examples, source device 100 may be configured to stop a transcoding process at a source device for transmitting content to a sink device in response to the triggering event (804). For example, if the compressed content to be displayed is decodable by the sink device. In other examples, source device 100 may be configured to start a transcoding process at a source device for transmitting content to a sink device in response to the triggering event (804). For example, if the compressed content to be displayed is not decodable by the sink device.

In some examples, monitoring the wireless display session includes one or more of monitoring a local playback status, monitoring a video decoder status, monitoring a decoding capability of the sink device, monitoring a wireless display controller status, and monitoring a network streaming client status. The triggering event may include one or more of video/audio decoder initialization, loading of a compressed file, loading or a parser module, loading of a display driver, and use of a display processor.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. In some examples, computer-readable media may comprise non-transitory computer-readable media. Data storage media may be any available media that can be accessed by one or more computers or one or more processors to retrieve instructions, code and/or data structures for implementation of the techniques described in this disclosure.

By way of example, and not limitation, such computer-readable media can comprise non-transitory media such as RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various embodiments of the invention have been described. These and other embodiments are within the scope of the following claims.

What is claimed is:

1. A method for wireless display of compressed content, the method comprising:
    determining, by a source device configured to display decoded content, a decoding capability of a sink device;
    receiving, by the source device, a request to display compressed content at the sink device in a wireless display session;
    in the case that the decoding capability of the sink device allows for decoding of the compressed content, transmitting the compressed content from the source device to the sink device, whereby transcoding and encoding the compressed content is avoided in the source device;
    decoding the compressed content at the source device to create decoded content;
    storing the decoded content at the source device;
    displaying the decoded content at the source device substantially simultaneously with display of the compressed content transmitted to the sink device;
    detecting a triggering event of stopping the transmitting of the compressed content in favor of displaying uncompressed content in a frame buffer;
    responsive to detecting the triggering event, initiating encoding of the uncompressed content in the frame buffer; and
    transmitting the encoded uncompressed content to the sink device.

2. The method of claim 1, in the case that the decoding capability of the sink device does not allow for decoding of the compressed content, the method further comprising:
encoding the decoded content in a format decodable by the sink device to create transcoded content; and
transmitting the transcoded content from the source device to sink device.

3. The method of claim 1, further comprising:
stopping a transcoding process at the source device for transmitting the compressed content to the sink device in the case that the decoding capability of the sink device allows for decoding of the compressed content.

4. A method for wireless display of compressed content, the method comprising:
forwarding the compressed content to a sink device in a wireless display session;
monitoring the wireless display session, wherein monitoring the wireless display session includes one or more of monitoring a local playback status, monitoring a video decoder status, monitoring a decoding capability of the sink device, monitoring a wireless display controller status, monitoring a camcorder application status, and monitoring a network streaming client status;
detecting a triggering event of stopping the forwarding of the compressed content in favor of displaying uncompressed content in a frame buffer;
responsive to detecting the triggering event, initiating encoding of the uncompressed content in the frame buffer; and
transmitting the encoded uncompressed content to the sink device.

5. The method of claim 4, further comprising:
stopping a transcoding process at a source device for transmitting content to the sink device in response to the triggering event.

6. The method of claim 4, further comprising:
starting a transcoding process at a source device for transmitting content to the sink device in response to the triggering event.

7. An apparatus configured for the wireless display of compressed content, the apparatus comprising:
means for determining, by a source device configured to display decoded content, a decoding capability of a sink device;
means for receiving, by the source device, a request to display compressed content at the sink device in a wireless display session;
in the case that the decoding capability of the sink device allows for decoding of the compressed content, means for transmitting the compressed content from the source device to the sink device, whereby transcoding and encoding the compressed content is avoided in the source device;
means for decoding the compressed content at the source device to create decoded content;
means for storing the decoded content at the source device;
means for displaying the decoded content at the source device substantially simultaneously with display of the compressed content transmitted to the sink device;
means for detecting a triggering event of stopping the transmitting of the compressed content in favor of displaying uncompressed content in a frame buffer;
means for initiating, responsive to detecting the triggering event, encoding of the uncompressed content in the frame buffer; and
means for transmitting the encoded uncompressed content to the sink device.

8. The apparatus of claim 7, in the case that the decoding capability of the sink device does not allow for decoding of the compressed content, the apparatus further comprising:
means for encoding the decoded content in a format decodable by the sink device to create transcoded content; and
means for transmitting the transcoded content from the source device to sink device.

9. The apparatus of claim 7, further comprising:
means for stopping a transcoding process at the source device for transmitting the compressed content to the sink device in the case that the decoding capability of the sink device allows for decoding of the compressed content.

10. A apparatus for wireless display of compressed content, the apparatus comprising:
means for forwarding the compressed content to a sink device in a wireless display session;
means for monitoring a wireless display session, wherein the means for monitoring the wireless display session includes one or more of means for monitoring a local playback status, means for monitoring a video decoder status, means for monitoring a decoding capability of the sink device, means for monitoring a wireless display controller status, means for monitoring a camcorder application status, and means for monitoring a network streaming client status;
means for detecting a triggering event of stopping the forwarding of the compressed content in favor of displaying uncompressed content in a frame buffer;
means for initiating, responsive to detecting the triggering event, encoding of the uncompressed content in the frame buffer; and
means for transmitting the encoded uncompressed content to the sink device.

11. The apparatus of claim 10, further comprising:
means for stopping a transcoding process at a source device for transmitting content to the sink device in response to the triggering event.

12. The apparatus of claim 10, further comprising:
means for starting a transcoding process at a source device for transmitting content to the sink device in response to the triggering event.

13. An apparatus configured for wireless display of compressed content, the apparatus comprising:
a memory configured to store at least a portion of the compressed content; and
one or more processors configured to:
determine, by a source device configured to display decoded content, a decoding capability of a sink device;
receive, by the source device, a request to display compressed content at the sink device in a wireless display session;
in the case that the decoding capability of the sink device allows for decoding of the compressed content, transmit the compressed content from the source device to the sink device, whereby transcoding and encoding the compressed content is avoided in the source device;
decode the compressed content at the source device to create decoded content;
store the decoded content at the source device;

display the decoded content at the source device substantially simultaneously with display of the compressed content transmitted to the sink device:
detect a triggering event of stopping the transmitting of the compressed content in favor of displaying uncompressed content in a frame buffer;
responsive to detecting the triggering event, initiate encoding of the uncompressed content in the frame buffer; and
transmit the encoded uncompressed content to the sink device.

14. The apparatus of claim 13, in the case that the decoding capability of the sink device does not allow for decoding of the compressed content, the one or more processors are further configured to:
encode the decoded content in a format decodable by the sink device to create transcoded content; and
transmit the transcoded content from the source device to sink device.

15. The apparatus of claim 13, wherein the one or more processors are further configured to:
stop a transcoding process at the source device for transmitting the compressed content to the sink device in the case that the decoding capability of the sink device allows for decoding of the compressed content.

16. An apparatus configured for wireless display of compressed content, the apparatus comprising:
a memory configured to store at least a portion of the compressed content; and
one or more processors configured to:
forward the compressed content to a sink device in a wireless display session;
monitor a wireless display session, wherein monitoring the wireless display session includes one or more of monitoring a local playback status, monitoring a video decoder status, monitoring a decoding capability of the sink device, monitoring a wireless display controller status, monitoring a camcorder application status, and monitoring a network streaming client status;
detect a triggering event of stopping the forwarding of the compressed content in favor of displaying uncompressed content in a frame buffer;
responsive to detecting the triggering event, initiate encoding of the uncompressed content in the frame buffer; and
transmit the encoded uncompressed content to the sink device.

17. The apparatus of claim 16, wherein the one or more processors are further configured to:
stop a transcoding process at a source device for transmitting content to the sink device in response to the triggering event.

18. The apparatus of claim 16, wherein the one or more processors are further configured to:
start a transcoding process at a source device for transmitting content to the sink device in response to the triggering event.

19. A non-transitory computer-readable storage medium storing instructions that, when executed, cause one or more processors configured for wireless display of compressed content to:
determine, by a source device configured to display decoded content, a decoding capability of a sink device;
receive, by the source device, a request to display compressed content at the sink device in a wireless display session;
in the case that the decoding capability of the sink device allows for decoding of the compressed content, transmit the compressed content from the source device to the sink device, whereby transcoding and encoding the compressed content is avoided in the source device;
decode the compressed content at the source device to create decoded content;
store the decoded content at the source device;
display the decoded content at the source device substantially simultaneously with display of the compressed content transmitted to the sink device;
detect a triggering event of stopping the transmitting of the compressed content in favor of displaying uncompressed content in a frame buffer;
responsive to detecting the triggering event, initiate encoding of the uncompressed content in the frame buffer; and
transmit the encoded uncompressed content to the sink device.

20. The non-transitory computer-readable storage medium of claim 19, in the case that the decoding capability of the sink device does not allow for decoding of the compressed content, the instructions further cause the one or more processors to:
encode the decoded content in a format decodable by the sink device to create transcoded content; and
transmit the transcoded content from the source device to sink device.

21. The non-transitory computer-readable storage medium of claim 19, wherein the instructions further cause the one or more processors to:
stop a transcoding process at the source device for transmitting the compressed content to the sink device in the case that the decoding capability of the sink device allows for decoding of the compressed content.

22. A non-transitory computer-readable storage medium storing instructions that, when executed, cause one or more processors configured for wireless display of compressed content to:
forward the compressed content to a sink device in a wireless display session;
monitor a wireless display session, wherein monitoring the wireless display session includes one or more of monitoring a local playback status, monitoring a video decoder status, monitoring a decoding capability of the sink device, monitoring a wireless display controller status, monitoring a camcorder application status, and monitoring a network streaming client status;
detect a triggering event of stopping the forwarding of the compressed content in favor of displaying uncompressed content in a frame buffer;
responsive to detecting the triggering event, initiate encoding of the uncompressed content in the frame buffer; and
transmit the encoded uncompressed content to the sink device.

23. The non-transitory computer-readable storage medium of claim 22, wherein the instructions, when executed, further cause the one or more processors to:
stop a transcoding process at a source device for transmitting content to the sink device in response to the triggering event.

24. The non-transitory computer-readable storage medium of claim 22, wherein the instructions, when executed, further cause the one or more processors to:

start a transcoding process at a source device for transmitting content to the sink device in response to the triggering event.

\* \* \* \* \*